United States Patent
Agapi et al.

(10) Patent No.: US 8,010,343 B2
(45) Date of Patent: Aug. 30, 2011

(54) DISAMBIGUATION SYSTEMS AND METHODS FOR USE IN GENERATING GRAMMARS

(75) Inventors: Ciprian Agapi, Lake Worth, FL (US); Brent D. Metz, Delray Beach, FL (US)

(73) Assignee: Nuance Communications, Inc., Burlington, MA (US)

( * ) Notice: Subject to any disclaimer, the term of this patent is extended or adjusted under 35 U.S.C. 154(b) by 1024 days.

(21) Appl. No.: 11/304,964

(22) Filed: Dec. 15, 2005

(65) Prior Publication Data

US 2007/0143100 A1 Jun. 21, 2007

(51) Int. Cl.
*G06F 3/00* (2006.01)
*G06F 17/21* (2006.01)
(52) U.S. Cl. .......................................... 704/10; 715/700
(58) Field of Classification Search .................. 715/534; 704/10
See application file for complete search history.

(56) References Cited

U.S. PATENT DOCUMENTS

| | | | |
|---|---|---|---|
| 5,497,319 A * | 3/1996 | Chong et al. ....................... | 704/2 |
| 6,083,276 A | 7/2000 | Davidson et al. | |
| 6,336,214 B1 | 1/2002 | Sundaresan | |
| 6,507,857 B1 | 1/2003 | Yalcinalp | |
| 6,714,631 B1 * | 3/2004 | Martin et al. ............... | 379/88.02 |
| 6,829,745 B2 | 12/2004 | Yassin et al. | |
| 7,149,694 B1 * | 12/2006 | Harb et al. .................. | 704/270.1 |
| 2002/0099734 A1 | 7/2002 | Yassin et al. | |
| 2002/0178008 A1 * | 11/2002 | Reynar .......................... | 704/272 |
| 2003/0163319 A1 * | 8/2003 | Kemble et al. ................ | 704/270 |
| 2005/0209853 A1 * | 9/2005 | Davis et al. ................... | 704/249 |
| 2007/0106499 A1 * | 5/2007 | Dahlgren et al. ............... | 704/10 |

FOREIGN PATENT DOCUMENTS

| WO | WO 96/17310 | 6/1996 |
|---|---|---|
| WO | WO 00/56033 | 9/2000 |

OTHER PUBLICATIONS

C++Journal: A Simple XML Parser; http://www.codeproject.com/soap/xmlmabparser.asp, as printed Dec. 15, 2005.

* cited by examiner

*Primary Examiner* — Justin W Rider
(74) *Attorney, Agent, or Firm* — Wolf, Greenfield & Sacks, P.C.

(57) ABSTRACT

A method and system for addressing disambiguation issues in interactive applications by creating a disambiguation system for generating complex grammars that includes homonym detection and grouping, and provides optimization feedback that eliminates time-consuming and repetitive iterative steps during the grammar generation portion of the interactive application configuration.

22 Claims, 3 Drawing Sheets

DISAMBIGUATION SYSTEMS AND METHODS FOR USE IN GENERATING GRAMMARS

BACKGROUND OF THE INVENTION

1. Field of the Invention

The present invention relates to the field of disambiguation systems and more particularly to a method and system that simplifies and optimizes the grammar generation process in an interactive, grammar-based application.

2. Description of the Related Art

During the configuration of an interactive, grammar-based application, for example, an interactive voice response (IVR) system, the grammar generation process is typically the most tedious and time consuming portion of the configuration process. Currently, large and complex grammars for speech applications that are generated automatically (programmatically) are too simplistic, and domain specific. The difficulties encountered are tied to time-consuming generation processes (for example, a grammar generation for 300,000 names can take up more or less 24 hours, depending on hardware), the repetitive and time-consuming tuning through empirical qualitative and quantitative measurements when dealing with massive databases, and decisions on set segmentation for recognition optimization, homonyms, synonyms, etc.

One of the difficulties encountered in the grammar generation process is the ambiguities that arise due to homophones, which are words that are pronounced the same (and may or may not be spelt the same), but differ in meaning, such as the words "waste" and "waist". In an interactive voice response (IVR) system, the presence of homophones can create difficulties during the grammar generation process. For example, in a voice-dialer application, when two or more people have identical sounding but differently spelled names, a caller asking for one person, might be connected to another due to the presence of a homophone.

A disambiguation system is needed to identify homophones and to create grammars that recognize the presence of homophones in order to resolve the ambiguities that they cause. The interactive application developer would benefit if he or she could be presented with a grammar view during the configuration step of the application. This view would provide valuable information to the developer, and would help to eliminate some of the time consuming iterative steps often present in the configuration of interactive applications.

However, recognizing the existence of homophones and incorporating a disambiguation system into the voice application addresses only part of the problem. One of the other problems related to grammar generation is the logistical complexity of taking data from an input source and generating a set of questions based on that data that can be presented to a user such that a single unique record or set of records is identified. The process of gathering data from a number of independent sources, normalizing the data, splitting and/or joining data fields, removing bad records, identifying homophones, etc. and then converting the data into grammar fields, has not been addressed in the prior art.

There is currently no interactive application configuration system or method that allows the application developer to retrieve data records from any input source, that develops complex grammars via use of a disambiguation system, and that provides an interactive user application resulting in the selection of the appropriate grammars based upon user responses to system prompts.

BRIEF SUMMARY OF THE INVENTION

Embodiments of the present invention address the deficiencies of the art in respect to interactive, grammar-based application configuration and provides a novel and non-obvious method and system for addressing disambiguation issues in voice applications by creating a grammar generation system for generating complex grammars, that includes homonym detection and grouping features, and provides optimization feedback that eliminates time-consuming and repetitive iterative steps during the grammar generation portion of the interactive application configuration.

In one embodiment, a method for generating grammars for use in an interactive application is provided. The method includes providing data records to be used in a grammar database, where each data record includes one or more disambiguation fields, identifying one or more disambiguation fields, applying a disambiguation engine to each data record, where the disambiguation engine resolves ambiguities relating to the data in the identified disambiguation fields, and generating one or more grammar files, the grammar files subject to application of the disambiguation engine.

In another embodiment, a system for generating grammars for use in an interactive application is provided. The system includes a data source containing data records to be used in a grammar database, where each data record includes one or more disambiguation fields. Also included is a disambiguation engine for resolving ambiguities relating to data in one or more identified disambiguation fields and a grammar generation engine for generating grammars after the disambiguation engine has resolved ambiguities relating to data in the one or more identified disambiguation fields. Finally, a display means is provided for displaying the results of the grammars generated by the grammar generation engine.

In yet another embodiment, a computer program product comprising a computer usable medium having computer usable program code for generating grammars for use in an interactive application, is provided. The grammars are generated from a data record source, where each data record includes one or more disambiguation fields. The computer program product includes computer usable program code for identifying one or more selected disambiguation fields, computer usable program code for resolving ambiguities relating to data in the identified disambiguation fields, and computer usable program code for generating one or more grammar files, where the grammar files include resolved ambiguities relating to data in the identified disambiguation fields.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of the specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method and system relating to disambiguation systems in interactive, grammar-based applications where the voice application developer is offered a grammar view during the configuration step that employs, among other things, homonym detection and grouping, and optimization feedback, such that the developer can create complex grammars to be used in interactive applications such as, but not limited to interactive voice response (IVR) systems, interactive textual applications, and multimodal applications.

The example described below relates to IVR systems but the principles of the invention are not limited to only voice recognition systems. Based on a set of data sources specified by a user, that may include, for example, the actual data, synonyms, homonyms, files and databases, a grammar generation application combines these files to generate source code for an application that generates one or multiple grammar files and, optionally, a speech application to call the generated grammars in the correct sequence. The actual application can be presented to the user through a Graphical User Interface (GUI), in the form of a wizard. The wizard described below, can be used from within a speech Integrated Development Environment (IDE).

As an illustrative example, a name dialer application having an XML database containing names is used. In the illustrative name dialer application, a caller speaks a person's name into their phone, and a voice recognition application receives the spoken audio, looks up appropriate responsive grammars, and "replies" to the caller with a computer generated "voice". The voice recognition application must generate a large set of complex grammars for use in the name dialer application so that grammars, when spoken by the caller, can be recognized by the voice recognition engine.

The present invention focuses on the configuration and generation of these grammars and presents a method to the voice application designer that allows the designer to address disambiguation problems often present in grammar set generation. Although the example below uses a name dialer application, the system and method of the present invention can be applied in other scenarios, particularly when the database used is considerable and consists of successive segmentation steps.

Figure 1:
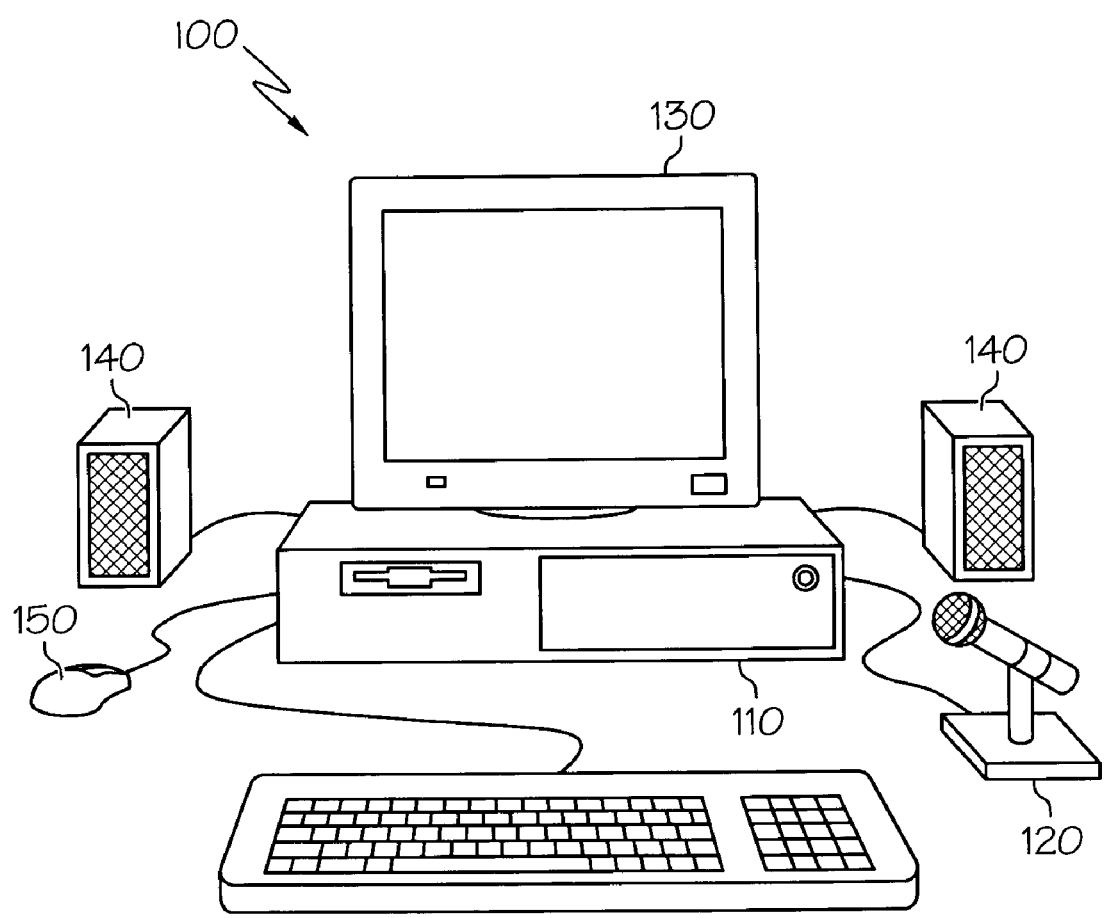
FIG. 1 is pictorial illustration of a computer system for speech recognition with which the method and system of the invention can be used.

In further illustration, FIG. 1 is a diagram illustrating a typical computer system 100 for use in conjunction with the present invention. The system is preferably comprised of a computer 110 including a central processing unit (CPU), one or more memory devices and associated circuitry. The system also includes a microphone 120 operatively connected to the computer system through suitable interface circuitry or a "sound board" (not shown), and at least one user interface display unit 130 such as a video data terminal (VDT) operatively connected thereto. The CPU can be comprised of any suitable microprocessor or other electronic processing unit, as is well known to those skilled in the art. Speakers 140, as well as an interface device, such as mouse 150, can also be provided with the system, but are not necessary for operation of the invention as described herein.

The various hardware requirements for the computer system as described herein can generally be satisfied by any one of many commercially available high speed multimedia personal computers. In addition to personal computers, the present invention can be used on any computing system that includes information processing and data storage components, including a variety of devices, such as handheld PDAs, mobile phones, networked computing systems, etc. The present invention provides a disambiguation system for use with, among other types of interactive applications, speech recognition applications, so that the present invention can be used in conjunction with any system where a speech recognition application can be used.

Figure 2:
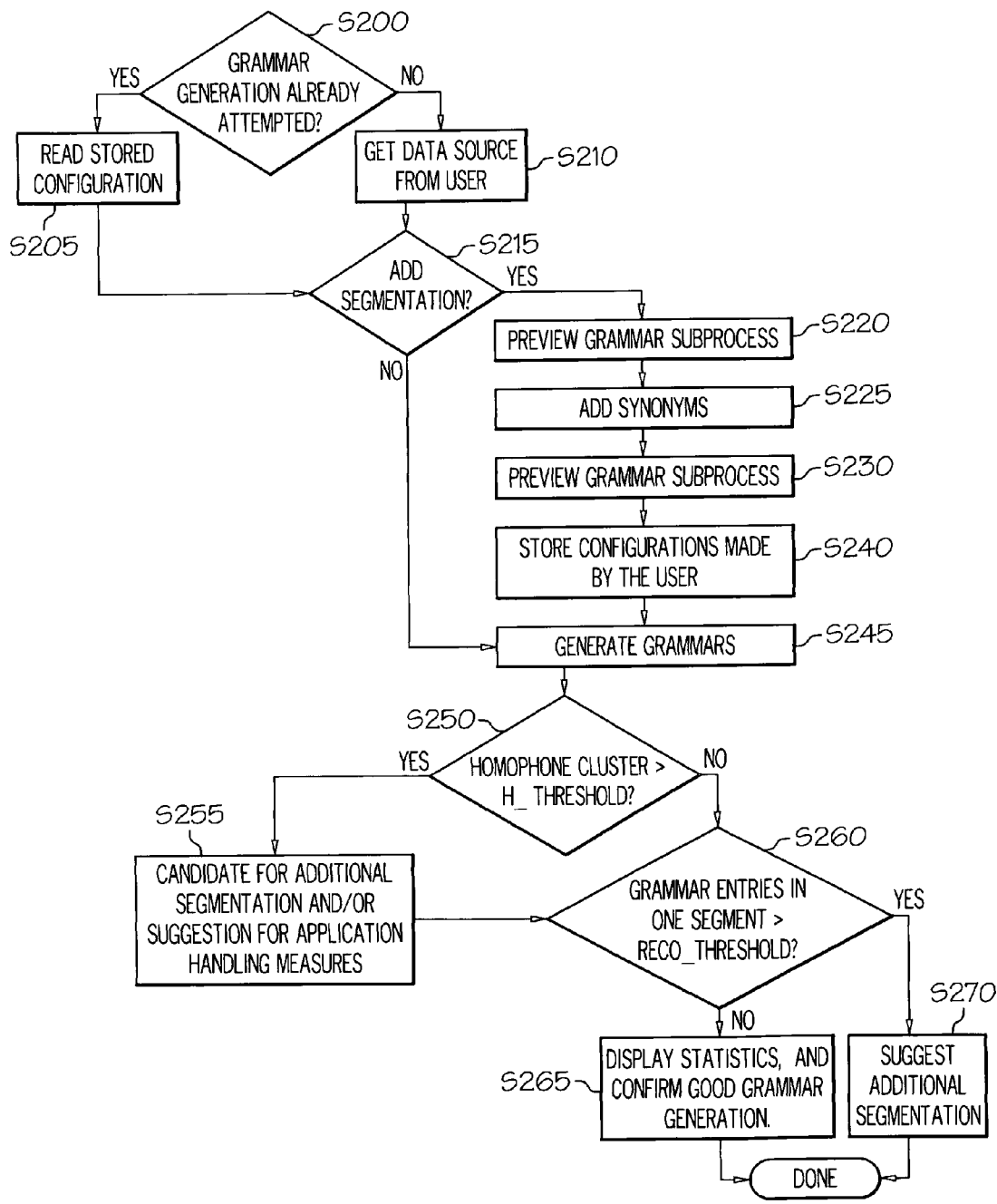
FIG. 2 is a flow chart illustrating a grammar generation process in accordance with an embodiment of the present invention.

Referring now to FIG. 2, a grammar generation process in accordance with the present invention can be seen. At step S200, the system determines if grammar generation has already been attempted. If it has been, the stored grammar configuration is read, at step S205. If there has not yet been any grammar generation, the data source needs to be identified, at step S210. The data source can be a file, a URL, or a database. If the data source is a file or a URL, the data format can be specified as XML, CVS or in unformatted text. In one embodiment, the voice application developer, i.e. "user", is presented with a grammar "wizard" screen, where selections are presented to the user, allowing the user to select a data source type, a data source location, and a data format.

The user may wish to provide a set of rules in order to normalize the data records in a particular format. For example, a data set may contain abbreviations such as "Corp.", "Dr.", "Part #" and so forth. In order to properly group fields during grammar set generation, these fields may need to be manipulated to provide records having the same or similar structure. After data records have been normalized, the user is then prompted to select the grammar format. The grammar file may be in a variety of formats, such as but not limited to, JSpeech Grammar Format (jsgf), Speech Recognition Grammar Specification (srgs), Backus-Naur Form (bnf), or Augmented Backus-Naur Form (abnf).

At this stage in the grammar file development, the user must decide if grammar segmentation (i.e. disambiguation) is required, via step S215. The user is prompted to select one or more (or no) disambiguation fields. In the name-dialer example, each data record contains, for example, the first and last name of each person, their surname, their nickname, the city where they work, their cell phone, office phone and home phone numbers, and their e-mail address. These fields are presented to the user in a window, allowing the user to select which fields the user wants to provide disambiguation for.

Figure 3:
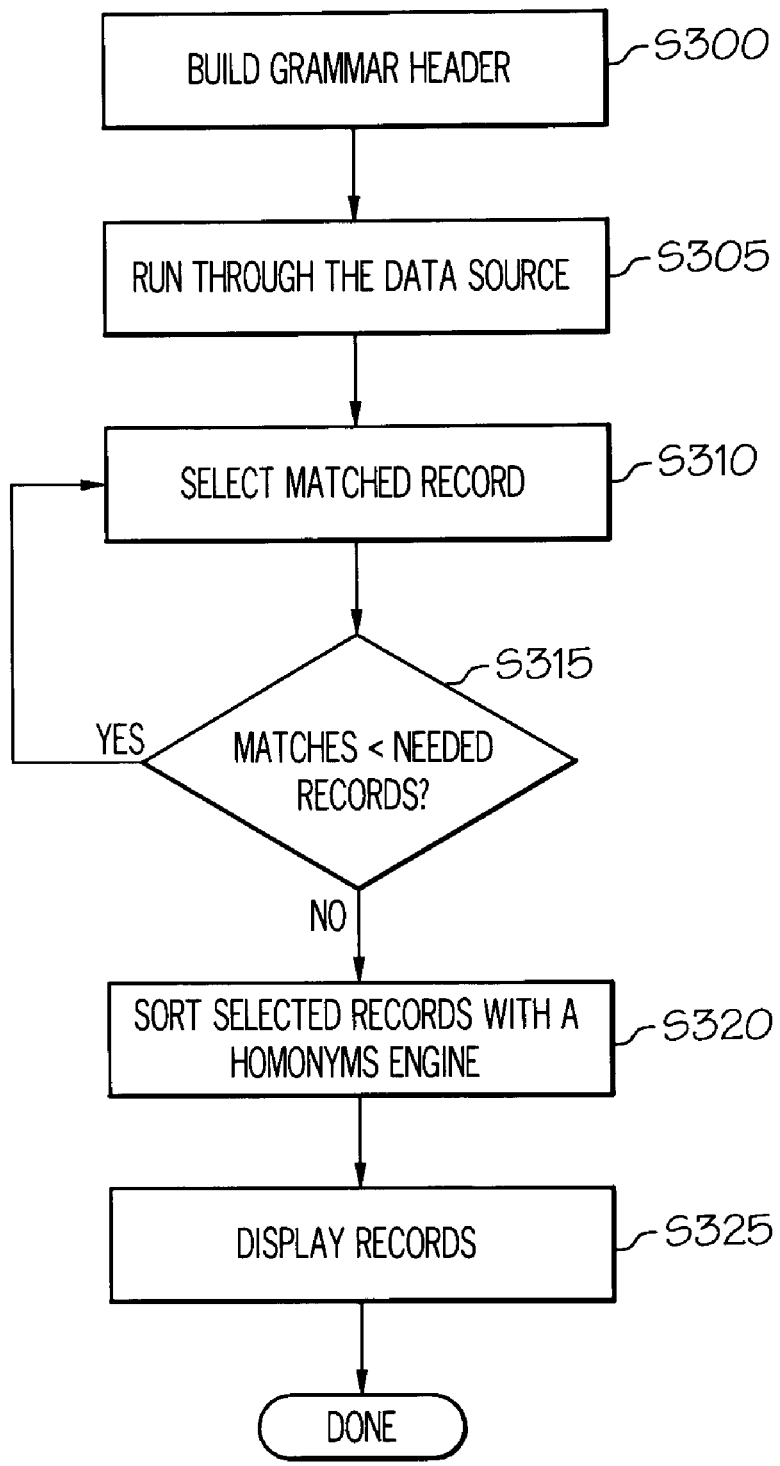
FIG. 3 is a flow chart providing detail of the grammar sub-process preview step of FIG. 2, in accordance with an embodiment of the present invention.

The user may select none of these categories, thereby choosing to have grammars generated without any segmentation. As an example, the user selects two disambiguation fields, the person's last and first names. If one or both of these names is not part of the data field for a particular record, that record can be discarded. All records that include the fields selected for disambiguation are then displayed. FIG. 3 represents the Preview Grammar Subprocess step as represented by step S220 in FIG. 2. FIG. 3 illustrates the subprocess taken by the present invention after the user has selected one or more disambiguation fields.

In FIG. 3, step S300 requires entry by the user of one or more disambiguation fields. Each record in the data source is examined to determine if there exists data in the selected fields, at step S305. For example, if some of the records do not contain a person's cell phone number, and this is one of the fields selected for disambiguation analysis, this data record is ignored. Each of the records containing data for the selected disambiguation field is selected from the data file, at step S 310. Each data file is searched for matches until the required number of records is found, via step S315.

The present invention allows an application developer to apply a disambiguation engine to selected data records in a data source by selecting one or more grammar or "disambiguation" fields. The disambiguation engine can include a homonym engine that identifies words that sound alike but may be spelled differently. In the name dialer example that we are using, if a caller dials into the system and requests to speak to "Lizzie Boyle", and if there is more than one data record contain a first name that may be identified as matching the user's request, a disambiguation problem exists.

For example, there may be a "Lizzie Boyle" living in Tennessee, and a Lizzy Boyle (the first name spelled differently), living in Florida. A homonym engine can sort these records, at step S320, and present them to the user, at step S325. Because the user selected "first name" and "last name" as the desired disambiguation fields, in a preview window presented to the user, the grammar subprocess identifies the homonyms "Lizzie Boyle" and "Lizzy Boyle" and groups them together thus providing the user with a visual validation that the disambiguation system of the invention recognized the two records having identical sounding first names. The system could employ a homonym detection engine by default or use a domain specific data source containing homonym information.

The system then presents fields that can be used in the annotation process in order to resolve situations where more than one record is presented due to an ambiguity. The annotation step is provided in order to reduce the number of records that are to be searched in the records database. In the example being used, additional information may be needed to resolve disambiguation. For example, the application could disambiguate only by the spelling of the names, as in the above example, or, with additional information, the disambiguation can be done using another field, for example the city where the person works, which provides an "extra layer" in which to resolve the ambiguity due to the similarity between two records based on the person's name.

Returning to FIG. 2, step S225 provides an example of an additional layer that may be used to resolve disambiguation problems. Step S225 allows for the recognition of synonyms in order to resolve disambiguation problems. It should be noted that the use of synonyms as an annotation field is merely an illustrative example, and any other field may used. In our scenario, a synonym for a name can be a nickname, or a name often used to identify them. For example, "William Doe" may also be known as "Bill Doe", or "Will Doe", and "Lizzie Boyle" may be referred to as "Liz Boyle". Thus, the user is presented with a grammar preview window that displays additional grammar entries that were generated based on the matched nicknames (Lizzie->Liz, and William->Bill, William->Will). By responding to a system prompt, the user is taken to a screen that presents visual confirmation that the selected disambiguation fields were entered and that grammars were generated with these fields taken into account when disambiguation occurs.

In addition to the use of homonyms and synonyms as disambiguation fields, other mandatory segmentation fields can be employed. One example is the use of regular expressions to identify particular values of particular fields for the purposes of rejection. For example, the term "Contractor" could be a mandatory string that causes a record without this string to be eliminated from an employee directory when pulling data from a database. Another example of a mandatory segmentation field is the phone number field in a name dialer application. If the office phone number were missing from the record, it would be of little use if the person was identified, because there is no way to contact that person. Therefore, in one embodiment, an office phone number can be considered to be a mandatory field.

Data obtained from a data source is often not in the correct format for use in a grammar. For example, it may be important to ask the user to specify only a city name but the data source may contain the field "citystate" in the form "Miami, Fla.". In this case it will be necessary to "split" the field into separate fields using regular expressions or specifying a delimiter. In the example above, a separate "city" and "state" field of "Miami" and "FL" would be created, respectively.

Similar to the problem of splitting data as described above, a data source might include data that needs to be joined in order to be properly used. For example, if the system-generated voice prompts the caller to specify a full name, and the data records coming from the data source have separate fields for the first and last name of a person, it will be necessary to create a new field that concatenates the two fields with a delimiter.

In order to build grammar sets, it is necessary to obtain from the system developer the order in which to disambiguate data records. For example, in the name-dialer application, a caller requesting a particular person by name may first be asked to specify the city that person lives in before asking the caller to specify the person's name. This will cause separate grammars to be created for each city. If the order was reversed, separate grammars would be created for each full name where more than one full name existed in the original data source.

Another technique that the application developer can use to enhance the voice interaction with a caller is to specify unique and non-unique field data subsets of field data that can be spoken by the user. As an example, the following airport names are present in the data source: "Miami International Airport" and "Austin Bergstrom International Airport". Allowing unique subsets causes a grammar to be generated such that every word or contiguous set of words that uniquely belong to a particular entry in the data source would be allowed. For example, the caller could say "Miami" and the record for "Miami International Airport" would be properly identified.

Allowing non-unique subsets would cause the grammar to be generated such that every word or contiguous set of words of a specified set size or greater can be spoken by the user. For example, the user could say "international airport" and all records in the data source where the specified field contains that phrase would be returned as an ambiguous result to the application.

In an embodiment of the present invention, an option is presented to automatically create speech application code to join grammar segments together. For example, if a grammar set is created where the first segment is a prompt for the caller to choose a city and the second segment is a prompt for the caller to specify a person's name, an application is generated that would automatically prompt the caller for the city name and then prompt for the person in the appropriate city's name. This option would allow a larger speech application call into the disambiguation process as a "black box" whose structure may change dramatically over time as the data set changes.

Continuing with FIG. 2, the system presents a grammar subprocess screen to the user each time the user selects another disambiguation field, at step S230. The system stores the configurations made by the user, at step S240, and generates the grammars, at step S245. At the end of the grammar generation process, statistics about the process are presented along with suggestions for improving the quality of grammars. For example, the system can present the total number of all records processed, the total number of records omitted or discarded for failing to include a mandatory field, and the total number of valid records (the number processed minus the number omitted).

Another example of the types of statistics that can be collected and analyzed are the maximum number of grammar entries per segment recommended for a good recognition (say, for example 20,000). This number is configurable and depends on the specific recognition engine the system is using. The total number of grammar entries generated can also be collected and analyzed. This number is higher than the total number of records processed since it also includes to nicknames/synonyms.

Returning to the flowchart of FIG. 2, the system of the present invention must determine if its voice recognition engine is capable of recognizing each of the homophones stored in the data file. If it is determined that the total number of homophones in the data source ("Homophone Cluster") is greater than the number of homophones that that the system can recognize ("H_Threshold"), via step S250, then the system prompts the user that additional segmentation may be needed, via step S255. If the homophone threshold is not exceeded, it then must be determined if the speech recognition system can recognize all of the grammar entries in one segment. Because different engines have different recognition capacities, step S260 determines if the threshold is exceeded, and if it is, suggests that additional segmentation be performed, via step S270. Otherwise, the grammar generation statistics are calculated and displayed, and the user is informed that the grammar generation is complete, via step S265.

In steps S255 and S270, if it is determined that a grammar is too large in a particular segment, the system will suggest that additional segmentation is required. A large grammar is defined from the fidelity of a speech recognition engine. Depending on which engine is being used, different thresholds can be suggested. By way of example, consider a grammar where the total number of generated entries is 50,000, which may be too large for reliable recognition. The system of the present invention will display a warning that the speech recognition engine might be poor, and will prompt the user to configure another layer of segmentation to improve the quality of the grammar. In the example described above, segmentation based on city and/or state would be appropriate.

Other types of statistics that could be compiled and used to improve future grammar generation could include information about the longest disambiguation list in a particular segment and the largest number of grammar entries in a particular segment. If the grammar is not too large but the user unnecessarily chooses multiple segmentation steps such that there are a large number of segments with little data in each segment, the system will suggest the entire data set be consolidated. For example, consider a data set of 20,000 where most of the population (say 17,000) is concentrated in one state, and the rest of people are dispersed in 600 cities. If a segmentation is based on city and state first, 600 grammar files would be generated, and thus the browser will inefficiently load 600 grammar files, instead of loading one file with 20,000 names.

Other suggestions that can be made upon analysis of the final grammar generation statistics include determining if there is sufficient system memory, applying statistical weights to particular data entries if these entries appear disproportionately when compared to other data entries in that field, and separating the data into data subsets in order to generate grammars for a small number of records when a full grammar generation is not desired.

As an example of a statistical display as indicated in step S265 in FIG. 2, the following might be displayed to the user after the grammar generation process has been completed:

| | |
|---|---|
| Total records processed: | 6 |
| Total valid records: | 4 |
| Grammar entries generated: | 7 |
| Total records omitted: | 1 due to missing first name |
| | 1 due to missing last name |
| Max grammar entries/segment: | 20,000 (based on Company X recognition engine) |
| Longest disambiguation list: | 2 |
| Optimization: | The grammar generation was successful and no additional tuning is necessary |

Finally, the system provides an option that can be presented to the developer that allows the developer to generate executable code in order to perform the grammar set generation process or simply execute the grammar set generation. The generation of executable code allows the developer to run the grammar set generation as a batch mode operation on a server on a scheduled basis.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for generating grammars for use in an interactive application, the method comprising:
   providing data records to be used in a grammar database, each data record including one or more fields;
   prior to identifying, in response to a user-issued query, a set of the data records that satisfy the query and on which disambiguation is to be performed, receiving human input specifying on which of the fields of each of the data records homonym and/or synonym disambiguation is to be performed;
   applying a disambiguation engine to each data record to generate disambiguated data, wherein the disambiguation engine resolves ambiguities relating to at least one homophone and/or at least one synonym in the data in the specified fields; and
   based on the disambiguated data, generating one or more grammar files for use in the interactive application.

2. The method of claim 1, further comprising providing an end-user interactive application that selects appropriate grammars from the one or more grammar files upon receipt of user responses to system prompts.

3. The method of claim 1, further comprising displaying, on a display, ambiguities resolved by the disambiguation engine.

4. The method of claim 1, further comprising identifying annotation fields, the annotation fields representing additional disambiguation fields used to further resolve ambiguities.

5. The method of claim 1, further comprising calculating grammar generation statistics in order to optimize future grammar file generation.

6. The method of claim 5, wherein upon determining that a the number of grammar files generated exceeds a threshold value, further comprising suggesting the use of additional disambiguation fields.

7. The method of claim 1, wherein the one or more grammar files are generated for use in an interactive voice recognition system.

8. The method of claim 1, wherein the disambiguation engine resolves ambiguities relating to at least one homophone in the data in the specified fields.

9. A system for generating grammars for use in an interactive application, the system comprising:
   a data source, stored on at least one computer-readable storage medium, the data source comprising data records to be used in a grammar database, each data record including one or more fields;
   an input for, prior to identifying, in response to a user-issued query, a set of the data records that satisfy the query and on which disambiguation is to be performed, receiving human input that specifies on which of the fields of each of the data records homonym and/or synonym disambiguation is to be performed;
   a disambiguation engine stored on the at least one computer-readable storage medium, wherein the disambiguation engine resolves ambiguities relating to at least one homophone and/or at least one synonym in data in the specified fields of the one or more disambiguation fields to generate disambiguated data; and
   a grammar generation engine stored on the at least one computer-readable storage medium, wherein the grammar generation engine generates one or more grammar files based on the disambiguated data for use in the interactive application.

10. The system of claim 9, further comprising an application generation engine for providing an end-user interactive application that selects appropriate grammars from the one or more grammar files upon receipt of user responses to system prompts.

11. The system of claim 9, further comprising display means for displaying the results of the one or more grammar files generated by the grammar generation engine.

12. The system of claim 11, wherein the display means displays annotation fields representing additional disambiguation fields used to further resolve ambiguities.

13. The system of claim 9, further comprising a results collection module for generating statistics in order to optimize future grammar generation.

14. The system of claim 13, wherein the results collection module suggests additional disambiguation fields for identification upon determining that a number of grammar files generated is too large.

15. The system of claim 9, wherein the one or more grammar files are generated for use in an interactive voice recognition system.

16. At least one tangible computer readable storage medium encoded with instructions that, when executed by at least one processing unit, perform a method for generating grammars for use in an interactive application, wherein the grammars are generated from a data record source and each data record includes one or more fields, the method comprising:
   prior to identifying, in response to a user-issued query, a set of the data records that satisfy the query and on which disambiguation is to be performed, receiving human input specifying on which of the fields of each of the data records homonym and/or synonym disambiguation is to be performed;
   resolving ambiguities relating to at least one homophone and/or at least one synonym in data in the specified fields to generate disambiguated data; and
   based on the disambiguated data, generating one or more grammar files for use in the interactive application.

17. The at least one tangible computer readable storage medium of claim 16, the method further comprising:
   providing an end-user interactive application that selects appropriate grammars from the one or more grammar files upon receipt of user responses to system prompts.

18. The at least one tangible computer readable storage medium of claim 16, the method further comprising:
   identifying annotation fields, the annotation fields representing additional disambiguation fields used to further resolve ambiguities.

19. The at least one tangible computer readable storage medium of claim 16, the method further comprising:
   calculating grammar generation statistics in order to provide optimization advice for future grammar file generation.

20. The at least one tangible computer readable storage medium of claim 19, wherein the optimization advice is based on voice recognition engine capabilities.

21. The at least one tangible computer readable storage medium of claim 19, the method further comprising:
   upon determining that a number of grammar files generated exceeds a threshold value, suggesting the use of additional disambiguation fields.

22. The at least one tangible computer readable storage medium of claim 16, wherein the one or more grammar files are generated for use in an interactive voice recognition system.

* * * * *

UNITED STATES PATENT AND TRADEMARK OFFICE
CERTIFICATE OF CORRECTION

PATENT NO. : 8,010,343 B2
APPLICATION NO. : 11/304964
DATED : August 30, 2011
INVENTOR(S) : Ciprian Agapi et al.

Page 1 of 1

It is certified that error appears in the above-identified patent and that said Letters Patent is hereby corrected as shown below:

Claim 6, column 9, at lines 33-34, should read:

--The method of claim 5, wherein upon determining that a number of grammar files generated exceeds a threshold--

Signed and Sealed this
Thirteenth Day of March, 2012

David J. Kappos
*Director of the United States Patent and Trademark Office*